United States Patent
Sato et al.

(10) Patent No.: US 7,530,825 B2
(45) Date of Patent: May 12, 2009

(54) HARNESS INSTALLATION STRUCTURE

(75) Inventors: Kunihiko Sato, Kosai (JP); Takehiko Uehara, Kosai (JP)

(73) Assignee: Yazaki Corporation, Tokyo (JP)

( * ) Notice: Subject to any disclaimer, the term of this patent is extended or adjusted under 35 U.S.C. 154(b) by 49 days.

(21) Appl. No.: 11/615,685

(22) Filed: Dec. 22, 2006

(65) Prior Publication Data

US 2007/0148992 A1 Jun. 28, 2007

(30) Foreign Application Priority Data

Dec. 27, 2005 (JP) ............................. 2005-374691

(51) Int. Cl.
*H01R 3/00* (2006.01)
(52) U.S. Cl. ...................................... 439/162
(58) Field of Classification Search ............... 439/34, 439/162, 165; 174/72 A, 86, 101; 296/155, 296/146.11, 146.7
See application file for complete search history.

(56) References Cited

U.S. PATENT DOCUMENTS

| | | | |
|---|---|---|---|
| 6,350,956 B1 * | 2/2002 | Sakata | 174/101 |
| 6,575,760 B2 * | 6/2003 | Doshita et al. | 439/34 |
| 6,682,353 B2 * | 1/2004 | Bigotto | 439/34 |
| 7,032,953 B2 * | 4/2006 | Rangnekar et al. | 296/146.11 |
| 7,304,239 B1 * | 12/2007 | Harris et al. | 174/72 A |

FOREIGN PATENT DOCUMENTS

| | | |
|---|---|---|
| DE | 19948852 C1 | 10/1999 |
| JP | 10-053077 A | 2/1998 |
| JP | 10-175444 A | 6/1998 |
| JP | 10-175483 A | 6/1998 |
| JP | 2001-119834 A | 4/2001 |
| JP | 2001-151042 A | 6/2001 |
| JP | 2001-260770 A | 9/2001 |
| JP | 2001-359232 A | 12/2001 |
| JP | 2004-176302 A | 6/2004 |
| JP | 2005-001560 A | 1/2005 |
| JP | 2005-124352 A | 5/2005 |
| WO | 2005/010400 A1 | 2/2005 |

* cited by examiner

*Primary Examiner*—Neil Abrams
(74) *Attorney, Agent, or Firm*—Sughrue Mion, PLLC

(57) ABSTRACT

A harness installation structure includes a link arm (2) that pivotally supports a movable body (1) to a fixed body (4), a wire harness (14) that is installed to extend from the fixed body (4) to the movable body (1) along the link arm (2). The wire harness (14) is fixed without looseness at a region between one end of the link arm (2) and the movable body (1) and through a tubular protector (11). The wire harness (14) is installed to extend in a bendable manner from the other end of the link arm (2) to the fixed body (4). While the movable body (1) is moved between an opened position and a closed position, a protector (15) with a flexible portion (18) is used to tighten the wire harness portion (14a2) adjacent to the movable body (1) and surplus length of the wire harness adjacent to the fixed body (4) is absorbed by forming a bent portion (26) of the wire harness.

9 Claims, 6 Drawing Sheets

HARNESS INSTALLATION STRUCTURE

BACKGROUND OF THE INVENTION

This invention relates to a harness installation structure of a link-type movable body, in which the movable body such for example as a door of an automobile is supported by a link so as to be opened and closed, and a power supply wire harness is installed along the link, and is arranged to extend vertically upwardly, and these upwardly-extending portions are twisted when the door is opened and closed.

FIG. 6 shows one related harness installation structure of a link-type movable body (see JP-A-10-175483 (FIGS. 5 and 9)).

This link-type movable body is a link-type door 62, and the link-type door 62 is swingably supported on a vehicle body 70 by a single support arm 71 of a generally L-shape. The support arm 71 has a high rigidity so as to support the weight of the door 62.

Besides the support arm 71, a pair of front and rear link arms 66 and 65 are provided in parallel relation to each other, and each of the link arms 65 and 66 is pivotally supported at its proximal end on the vehicle body 70, and also is pivotally supported at its distal end on a slider 64. The slider 64 is slidably engaged in a horizontal guide rail 63 mounted on the door.

There is provided a harness support structure in which a wire harness 68 extending from the vehicle body is installed horizontally along an outer surface of the front link arm 66, an is fixed to the link arm 66 by a holder 72, and one side portion of the wire harness 68, while bent in a generally U-shape or a generally J-shape, extends along a caterpillar-like exterior member 69 provided in continuous relation to the slider 64 within the guide rail on the door, and is introduced into the door, and is connected to auxiliary equipments and electrical equipments within the door. The other side portion 68a of the wire harness 68 is installed to be slightly bent toward the vehicle body 70, and is connected to a power source. In FIG. 6, the right side is the front side of the vehicle.

Examples of the auxiliary equipments include a power window motor, a door lock unit, a speaker and a door opening/closing drive device. In order to continuously supply electric power to these auxiliary equipments, the link arms 65 and 66, the guide rail 63, the slider 64 and the exterior member 69 are used as a mechanism for absorbing an opening/closing stroke of the door 62. The exterior member 69 is received in a receiving case 67 disposed beneath the guide rail 63.

When the door 62 is fully closed, the support arm 71 and the link arms 65 and 66 are extended forward, and the slider 64 moves toward a front end of the guide rail 63, and the one side portion of the wire harness 68 is received in the receiving case 67 through a bending action of the exterior member 69. The wire harness 68 is turned together with the link arm 66.

When fully opening the door 62, the link arms 65 and 66 maintains a door half-opened condition shown in FIG. 6, and the support arm 71 is extended rearward, and the slider 64 moves toward a rear end of the guide rail 63, and the wire harness 68, together with the exterior member 69, is drawn out rearward long.

However, in the above related harness installation structure of the link-type movable body, in addition to the support arm 71, the pair of link arms 65 and 66 are required, and therefore there has been encountered a problem that the structure is complicated and costly. And besides, in order to absorb a surplus length of the wire harness 68, the guide rail 63, the slider 64, the caterpillar-type exterior member 69, etc., need to be provided, and this has invited a problem that the structure is further complicated and costly. Furthermore, when the door 62 is opened and closed, the surplus length portion 68a of the wire harness 68 is loosened to be bent, and is pulled at a proximal end portion 66a (at the vehicle body 70) of the link arm 66, and therefore not only the surplus length must be absorbed at the door side, but also care must be taken so that the wire harness 68 will not be caught by the link arm 66 or others at the vehicle body side (Namely, management points exist both at the door side and the vehicle body side). Therefore, the design, management, etc., for positively effecting the continuous supply of electric power are very difficult, and besides a space for allowing the bending of the surplus length portion 68a of the wire harness 68 is required, and therefore there has been encountered a problem that the degree of freedom of arrangement of the vehicle body-side parts, etc., may be limited.

Even in the case where the above harness installation structure of the link-type movable body is applied to other movable body than the automobile door, there has been a fear that similar problems as described above arise.

SUMMARY OF THE INVENTION

With the foregoing in view, it is an object of this invention to provide a harness installation structure of a link-type movable body in which the structure can be simplified, and can be formed into a low-cost design, and besides the number of management points for a surplus length of a wire harness can be reduced, thereby enhancing the reliability of continuous power supply.

In order to achieve the above object, according to the present invention, there is provided a harness installation structure, comprising:

a link arm that pivotally supports a movable body to a fixed body;

a wire harness that is installed to extend from the fixed body to the movable body along the link arm, wherein the wire harness is fixed without looseness at a region between one end of the link arm and the movable body;

wherein the wire harness is installed to extend in a bendable manner from the other end of the link arm to the fixed body; and wherein while the movable body is moved between an opened position and a closed position, a surplus length of the wire harness is produced at other portion of the wire harness than a movable body-side portion of the wire harness, and the surplus length is absorbed by bending the wire harness.

With the above construction, the movable body is supported on the fixed body only by the link arm, and the link arm serves to support the movable body, and also serves to provide a path of installation of the wire harness. The wire harness is firmly fixed at the movable body-side region without looseness, and a harness surplus length, produced in accordance with the pivotal movement of the link arm during the opening and closing of the movable body, is absorbed, for example, by the bending movement of the harness portion extending along the link arm or by the bending movement of the wire harness at the fixed body-side region. Thus, the management point for the surplus length of the wire harness is limited only to the fixed body-side region. The production of the surplus length of the wire harness in accordance with the pivotal movement of the link arm is attributable mainly to the facts that axes of shaft portions of the link arm are offset from the axis of the wire harness portion installed therealong and that the position of the wire harness relative to the fixed body is changed when the movable body is moved between its open and closed positions.

Preferably, the harness installation structure, further comprising a harness protector that is provided on the link arm. The wire harness is bent within the harness protector so as to absorb the surplus length of the wire harness.

With the above construction, a surplus length, which would originally tend to be produced at the movable body-side portion of the wire harness in accordance with the pivotal movement of the link arm (Since the wire harness is firmly fixed at the movable body-side portion thereof, the surplus length will not be produced at the movable body-side portion.), is produced within the harness protector, and the surplus length portion is bent into a corrugated shape or other shape within the harness protector, and therefore is absorbed. The surplus length does not always need to be entirely absorbed within the harness protector, and in this case the wire harness is bent at the fixed body-side region so as to absorb the remaining surplus length. A rectangular tubular protector of the known type is used as the harness protector, and is fixed to the link arm by retaining clips, bolts or others.

Preferably, the harness installation structure, further comprising a slide protector that is provided on the link arm. The wire harness is installed at the slide protector, and is fixed to the slide protector. A harness surplus length, produced between the movable body and the fixed body while the movable body is moved between the opened position and the closed position, is sent toward the fixed body by the slide protector, and the wire harness is bent at a fixed body-side region so that the surplus length is absorbed.

With the above construction, a surplus length, which would originally tend to be produced at the movable body-side portion of the wire harness in accordance with the pivotal movement of the link arm (Since the wire harness is firmly fixed at the movable body-side portion thereof, the surplus length will not be produced at the movable body-side portion.), is smoothly and positively sent toward the fixed body by the sliding movement of the slide protector, and is added to the bent portion of the fixed body-side portion of the wire harness. As a result, the production and absorption of the surplus length are positively effected only at the fixed body-side harness portion. As the slide protector, there can be used, for example, the type of protector comprising an outer protector and an inner protector, and the outer protector is fixed to the link arm, and the wire harness is fixed to the inner protector, and the inner protector is slidably received within the outer protector.

Preferably, the harness installation structure further comprising an upwardly-extending portion that is formed at a movable body-side portion of the wire harness. The upwardly-extending portion is twisted in its peripheral direction while the movable body is moved between the opened position and the closed position.

With the above construction, at the firmly-fixed movable body-side portion of the wire harness, a strain produced in accordance with the swinging (pivotal) movement of the link arm during the opening and closing of the movable body is absorbed by the twisting movement of the upwardly-extending portion. Preferably, the upwardly-extending portion is installed along a protector provided on the movable body. A lower end of the upwardly-extending portion is not restrained, and an upper end thereof is fixed to the movable body-side protector or a movable body panel (in case the protector is not used). In the case of the present invention, the harness portion, horizontally led out of the link arm, is immediately continuous with the vertically upwardly-extending portion. In the above configuration, the harness portion, horizontally led out of the harness protector, is immediately continuous with the vertically upwardly-extending portion. Also, the harness portion, horizontally led out of the slide protector, is immediately continuous with the vertically upwardly-extending portion.

Preferably, the harness installation structure further comprises a movable body-side swinging portion that horizontally fixes the wire harness at the region between the one end of link arm and the movable body.

With the above construction, the movable body-side swinging portion swings together with the horizontal portion of the wire harness in accordance with the pivotal movement of the link arm during the opening and closing of the movable body. The length of the horizontal portion of the wire harness at the swinging portion during the swinging movement does not vary, and the swinging portion firmly holds the horizontal portion of the wire harness without producing any surplus length. The horizontal portion of the wire harness is continuous with the upwardly-extending portion. Preferably, the swinging portion is formed integrally with the movable body-side harness protector.

Here, it is preferable that the swinging portion is flexible.

With the above construction, the flexible swinging portion is flexibly bent together with the wire harness during the opening and closing of the movable body, and smoothly sends a surplus length portion toward the link arm and the fixed body. The swinging portion is smoothly bent or curved together with the horizontal portion of the wire harness with a relatively large radius of bending, thus preventing the wire harness from being abruptly bent with a small radius of bending. Preferably, the flexible swinging portion is in the form of a thin plate or sheet from the viewpoints of resin moldability and its ability to fix the wire harness.

Preferably, the movable body is a door, and the fixed body is a vehicle body.

With the above construction, in the harness installation structure of the link-type movable body, similar effects and advantage as described above can be achieved in the arrangement in which the movable body and the fixed body are replaced respectively by the door and the vehicle body.

In the above configuration, the supporting of the movable body and the provision of the wire harness installation path are achieved only by the link arm, and therefore the structure is simplified, and is formed into a low-cost design. And besides, the region where the surplus length of the wire harness is produced is limited to other portion of the wire harness than the movable body-side portion thereof, and therefore the design of the vehicle in which the production of the surplus length is taken into consideration is facilitated.

In the above configuration, the harness surplus length, tending to develop at the movable body-side harness portion, is produced in the harness protector, and is absorbed therein, and therefore the design of the vehicle in which the production of the surplus length is taken into consideration is further facilitated.

In the above configuration, the harness surplus length, tending to develop at the movable body-side harness portion, is sent toward the fixed body by the slide protector, and the harness surplus length is produced and absorbed only at the fixed body-side harness portion, and therefore the design of the vehicle in which the production of the surplus length is taken into consideration is further facilitated. And besides, a larger space for absorbing the surplus length is available at the fixed body-side region than at the movable body-side region, and therefore the above advantages are enhanced. Furthermore, the bent portion in a free condition (non-restrained condition) of the wire harness due to the production of the wire harness surplus length is limited to one portion, and therefore damage, etc., of the wire harness due to the bending movement is reduced, and the reliability of continuous power supply is enhanced.

In the above configuration, the movable body-side wire harness is twisted in accordance with the pivotal movement of the link arm during the opening and closing of the movable body, and therefore it is not necessary to produce any surplus length at the movable-body side harness portion, and the surplus length can be positively produced at other portion of the wire harness than the movable body-side portion thereof.

In the above configuration, in accordance with the pivotal movement of the link arm, the swinging portion swings while always keeping the length of the wire harness portion constant, and therefore any surplus length is positively prevented from being produced at the movable body-side harness portion.

In the above configuration, the movable body-side wire harness is supported by the flexible swinging portion so as to be bent with a relatively small radius of bending, and therefore any surplus length is prevented from being produced at the movable body-side portion, and a bending durability of the wire harness is enhanced.

In the above configuration, the costs of design, management, etc., for the installation of the wire harness from the vehicle body to the link-type door are reduced, so that the costs of the vehicle can be reduced, and besides the durability of the wire harness against the opening and closing of the door is enhanced, so that the reliability of continuous power supply to auxiliary equipments within the door is enhanced.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

Figure 1:
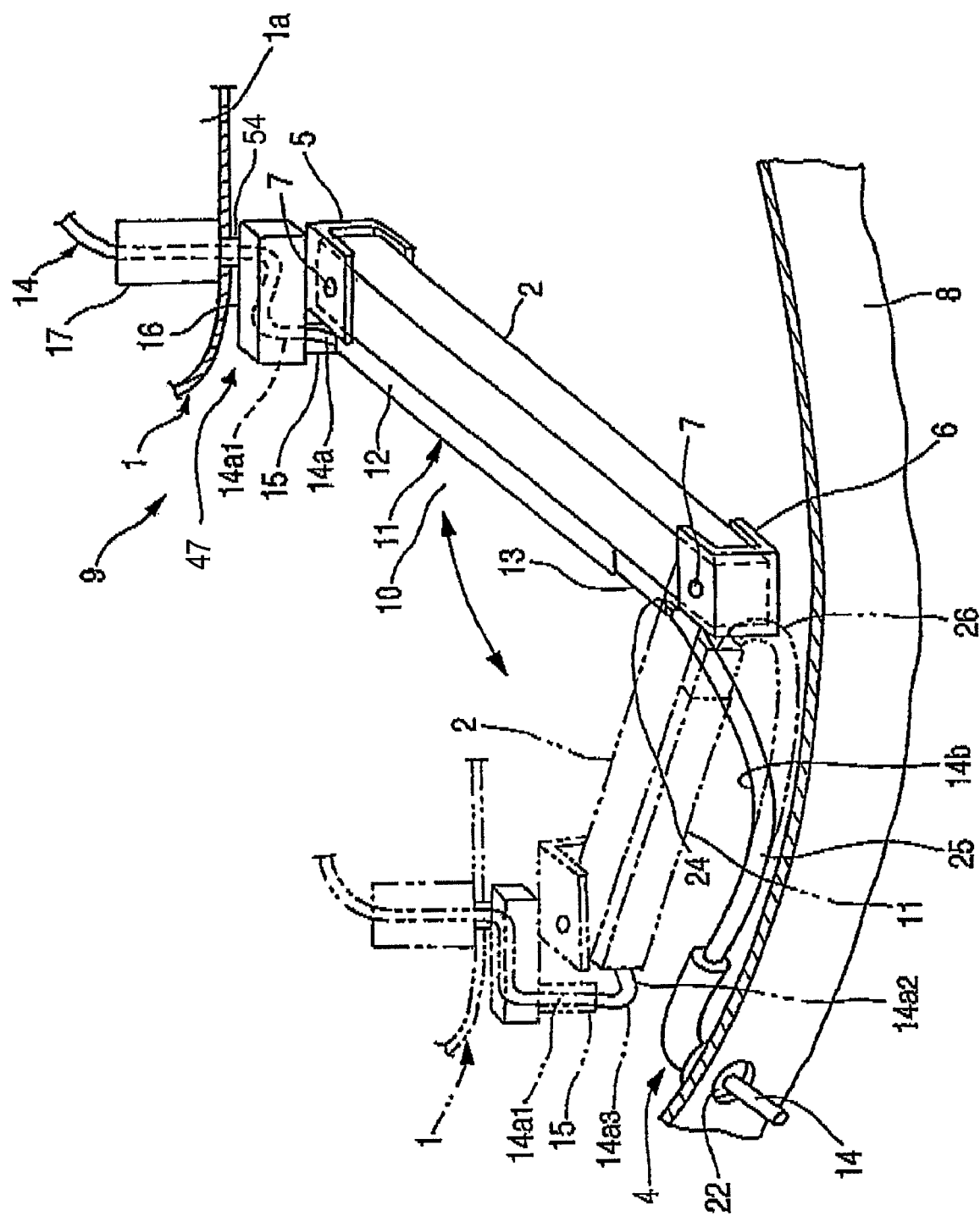
FIG. 1 is a perspective view showing a rough example of a harness installation structure of a link-type movable body provided in accordance with the present invention.

FIG. 1 shows a rough example of a harness installation structure of a link-type movable body embodying the present invention.

This link-type movable body is a link-type door 1 of an automobile, and the link-type door 1 is swingably (pivotally) supported on a vehicle body 4 by a link arm 2. The link arm 2 is made of a metallic material such as iron and an aluminum alloy, and has high strength and rigidity. Incidentally, another link arm (not shown) can be provided above the link arm 2 in opposed relation thereto, or another link arm (not shown) can be provided forwardly or rearwardly of the link arm 2 in parallel relation thereto, or besides the link arm 2, a guide rail (not shown) can be used to support the door 1.

A distal end portion of the link arm 2 is pivotally supported on a door (movable body)-side link bracket 5 by a shaft portion 7, and a proximal end portion of the link arm 2 is pivotally supported on a vehicle body (fixed body)-side link bracket 6 by a shaft portion 7. The vehicle body (fixed body)-side link bracket 6 is provided at the inner side of a rocker panel 8.

In FIG. 1, the left side is a front side of the vehicle, while the right side is a rear side of the vehicle. In FIG. 1, solid lines indicate a fully-open condition of the door 1, while dots-and-dash lines indicate a fully-closed condition of the door 1. When the door 1 is fully opened, the door 1 is projected outwardly from the vehicle body 4, and is moved rearward in offset relation to the vehicle body 4, so that an entrance/exit opening 9 is formed at the front side of the door 1, and a space 10 is formed between the door 1 and the vehicle body 4. When the door 1 is fully closed, the link arm 2 is turned forward, so that the door 1 is brought into intimate contact with the vehicle body 4. When the door 1 is opened and closed, the link arm 2 is swung, and the link brackets 5 and 6 are always kept parallel to each other.

A slide protector 11 made of a synthetic resin is mounted on an outer surface (front side surface) of the link arm 2 in parallel relation thereto. The slide protector 11 comprises an outer protector 12 of a rectangular tubular shape, and an inner protector 13 one size smaller in width than the outer protector 12. The outer protector 12 is disposed near to the door 1, and is immovably fixed to the link arm 2, while the outer protector 13 is disposed near to the vehicle body 4, and can slide within the outer protector 12.

A wire harness (including a plurality of insulated round wires) 14 is passed through the slide protector, and one side portion 14a of the wire harness 14 is led out of a distal end of the outer protector 12 toward the door 1, and the other side portion of the wire harness 14 is led out of a distal end of the inner protector 13 toward the vehicle body 4. The wire harness 14 is fixed to the inner protector 13, but is not fixed to the outer protector 12.

The one side portion 14a of the wire harness 14 extends vertically upwardly, for example, along a lower vertical portion 15 (shown in FIG. 2) of the door-side harness protector 47 (This upwardly-extending portion is designated by reference numeral $14a_1$.), and further is installed horizontally along a horizontally-extending protector 16 (shown in FIG. 1) (This horizontally-extending portion is designated by reference numeral $14a_2$.), and is vertically led out of an upper side of the horizontally-extending protector 16, and passes through a waterproof grommet 17 of an elastic nature, and is installed at an inner side of a door inner panel 1a. The lower vertical portion 15 and the horizontally-extending protector 16 can be formed integrally with each other.

Figure 2A:
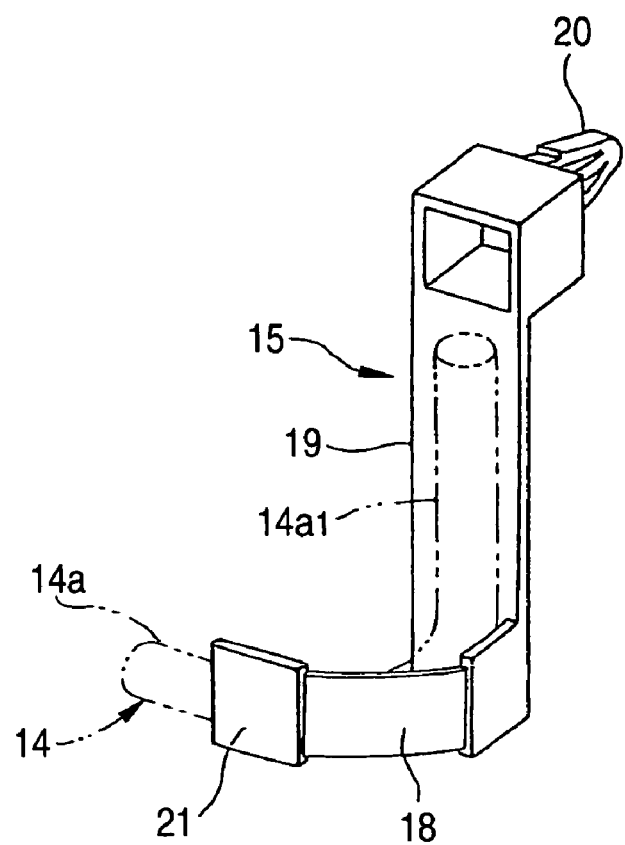
FIGS. 2A and 2B are perspective views of one example of a movable body-side protector used in the harness installation, showing its operation.
Figure 2B:
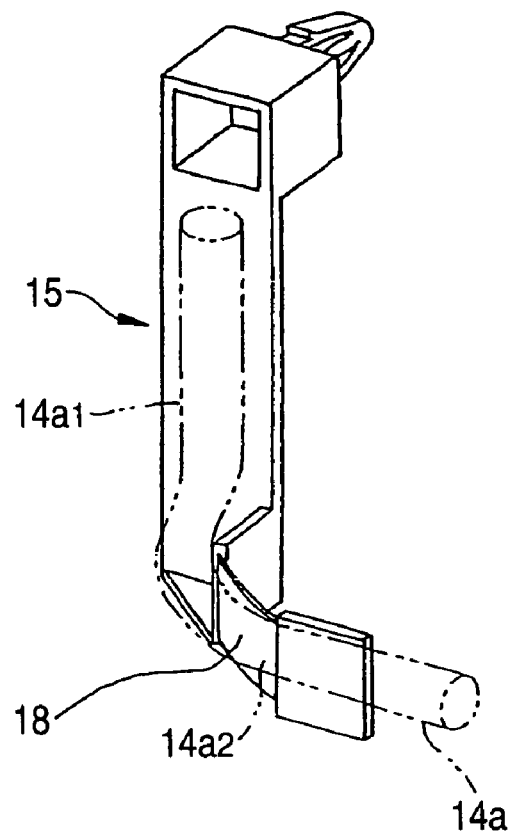

The protector 15 of FIGS. 2A and 2B is made of a synthetic resin, and includes a horizontally-projecting flexible swinging portion 18, a vertical plate portion 19 extending upwardly perpendicularly from the swinging portion 18, and a retaining clip 20 (for being fixed to the door) formed at an upper end portion of the vertical plate portion 19. A main portion of the swinging portion 18 is in the form of a thin plate or sheet, and a direction of its plate thickness coincides with the horizontal direction, and a direction of its plate width coincides with the vertical direction. The swinging portion 18 may be called a flexible plate portion or a flexible portion.

The one side portion 14a of the wire harness 14 is fixed horizontally to a thickened plate portion 21, formed at a distal end of the swinging portion 18, by winding a tap or by a band, and is bent at an angle of 90 degrees, and extends upwardly along the vertical plate portion 19 (The upwardly-extending portion is designated by reference numeral $14a_1$.). The thickened plate portion 21 is not flexible. In accordance with the opening and closing of the door 1, the wire harness 14 swings together with the swinging portion 18 as shown in FIGS. 2A and 2B, and also the upwardly-extending portion $14a_1$, extending along the vertical plate portion 19, is twisted in its peripheral direction (that is, twisted generally about an axis thereof) to respond to the pivotal movement of the link arm 2 (that is, to absorb looseness of the wire harness resulting from the pivotal movement). At the protector 15 of FIGS. 2A and 2B, the wire harness 14 is firmly fixed without looseness, and will not form any surplus length portion when the door is opened and closed.

In FIG. 1, the other side portion 14b of the wire harness 14 extends from the slide protector 11, and is horizontally installed forwardly along the rocker panel 8 of the vehicle body 4 in such a manner that the other side portion 14b has looseness (that is, has a surplus length). The other side portion 14b further passes through a hole 22 in the rocker panel 8, and is installed in the vehicle body 4, and is retained by a waterproof grommet 23 fitted in the hole 22. That portion of the other side portion 14b extending between the slide protector 11 and the waterproof grommet 23 is protected by a flexible protective tube (corrugated tube) 24 made of a synthetic resin.

The slide protector 11 is longitudinally expanded when the door 1 is fully opened, and the slide protector 11 is compressed when the door 1 is fully closed. In accordance with the expansion of the slide protector 11, the wire harness 14 is pushed out from the door toward the vehicle body, so that a harness surplus length concentrates on the vehicle body.

This operation is due to the fact that the horizontal portion $14a_2$ of the wire harness 14 extending between the door-side protector 15 to the slide protector 11 much detours in a generally U-shape outwardly of the shaft portion 7 when the door is fully closed, and this detouring portion $14a_3$ is extended straight to enter the slide protector when the door is fully opened. This operation is also due to the fact that the slide protector 11 is disposed such that its axis is slightly offset from the axes of the shaft portions of the link arm 2 toward a vehicle body-side harness fixing point, and the slide protector 11 approaches the vehicle body-side harness fixing point when the door is fully closed. The harness fixing point is, for example, a portion where the grommet 23 is provided or a portion (in the vicinity of a portion designated by reference numeral 25) where the corrugated tube 24 is fixed to the rocker panel 8.

When the door 1 is fully opened, that portion of the other side portion 14b of the wire harness 14 extending from the slide protector 11 to the rocker panel 8 is smoothly curved or bent with a large radius as indicated by solid lines, and when the door 1 is fully closed, the portion of the other side portion 14b is folded back or bent with a relatively small radius (This bent portion is designated by reference numeral 26.) as indicated by dots-and-dash lines, thereby absorbing a harness surplus length.

Thus, the wire harness 14 is fixed at the door, and is swingably supported by the swinging portion 18 of the protector 15, and a surplus length of the wire harness 14 is produced and absorbed only at the vehicle body. Therefore, a management point for a surplus length is reduced to one (at the vehicle body), and the design and management for positively effecting the continuous power supply can be facilitated, and the reliability of the continuous power supply is enhanced.

Figure 3:
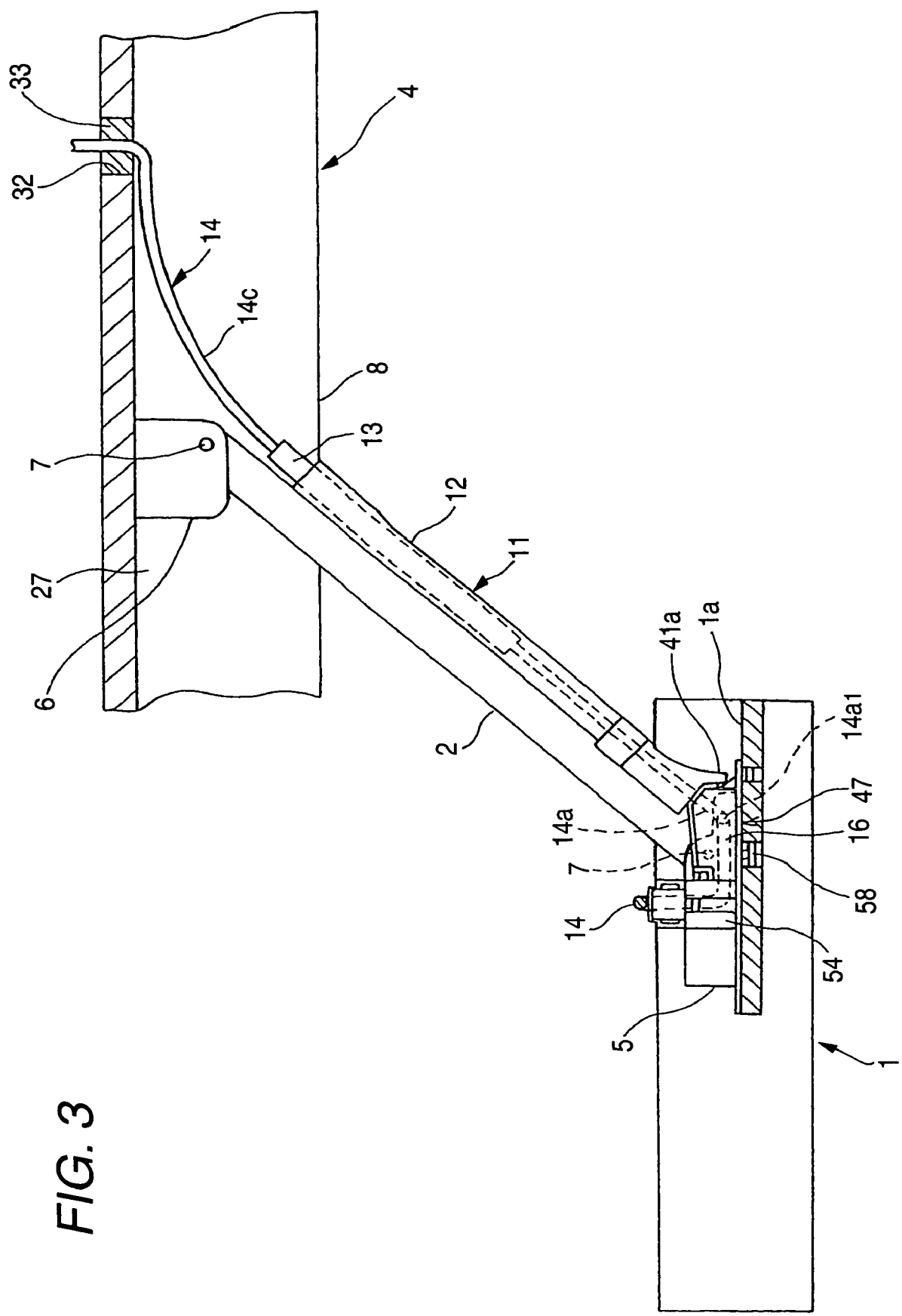
FIG. 3 is a plan view showing a detailed example of a harness installation structure of a link-type movable body of the present invention in a fully-open condition of the movable body.
Figure 4:
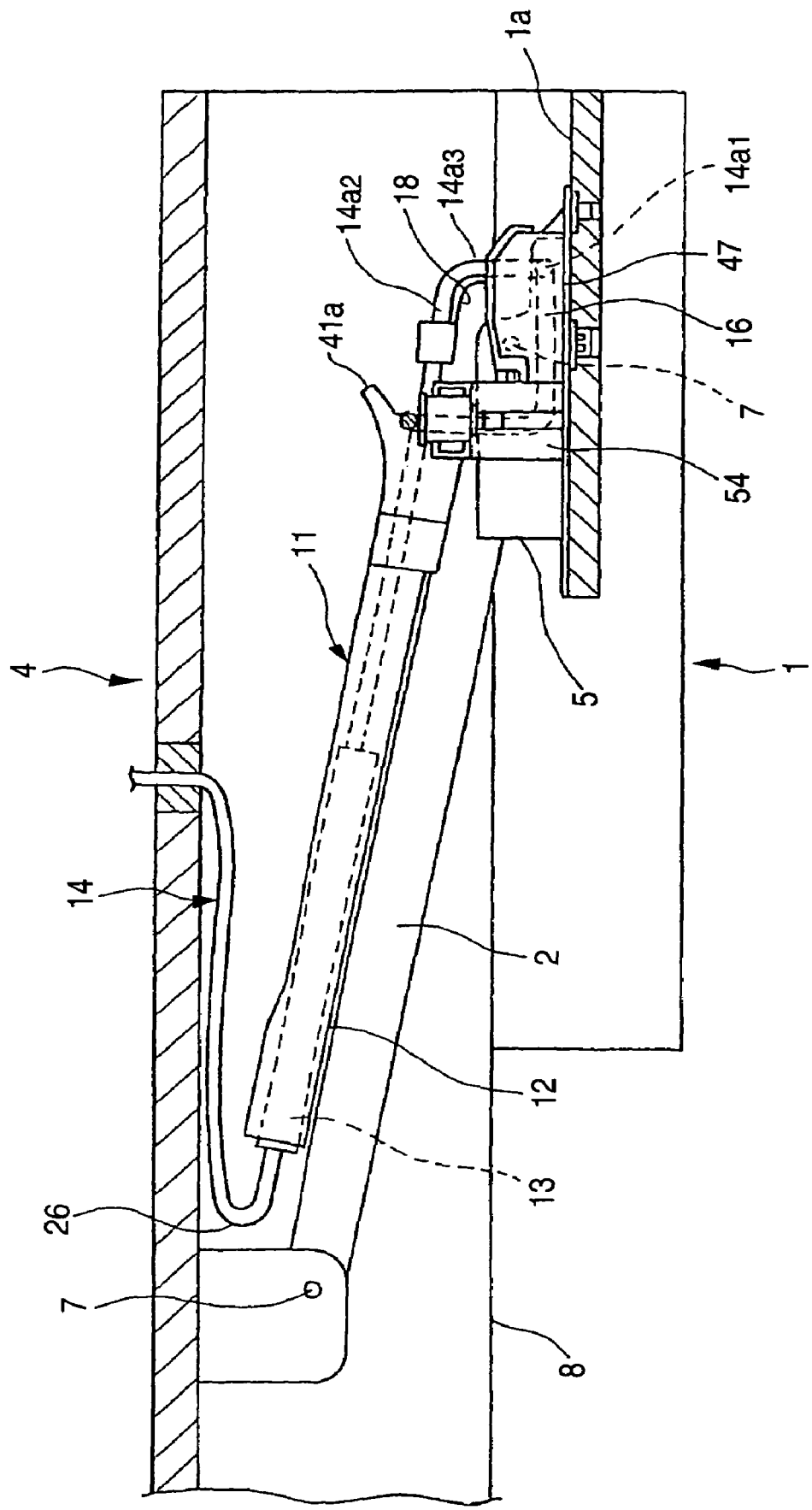
FIG. 4 is a plan view showing the detailed example of the harness installation structure of the link-type movable body in a fully-closed condition of the movable body.

FIGS. 3 to 4 show a detailed example of a harness installation structure of a link-type movable body embodying the present invention. This detailed example is basically similar to the rough example of FIG. 1, and those portions similar in construction and operation to the corresponding portions of FIG. 1 will be designated by identical reference numerals, respectively, and detailed description thereof will be omitted.

FIG. 3 is a plan view which shows a door (movable body) fully-open condition, and is illustrated with the front and rear sides reversed with respect to FIG. 1. FIG. 4 is a plan view showing a door fully-closed condition. A rocker panel 8 of a vehicle body (fixed body) 4 has a generally recumbent U-shaped cross-section, and extends horizontally. An inner panel 1a (part of which is shown) of a door 1 extends vertically upwardly from a bottom portion 1b of the door.

A wire harness 14 extends generally along a horizontal groove portion 27 of the rocker panel 8, and passes through a slide protector 11 on a link arm 2, and is swingably fixed at a lower vertical portion 15 of the door-side harness protector 47 (FIG. 1), and extends upwardly so as to be twisted (This upwardly-extending portion is designated by reference numeral $14a_1$.), and is installed along the inner panel 1a. A door trim (not shown) is attached to the inner panel 1a, and the lower vertical portion 15 is disposed between the inner panel 1a and the door trim.

A hinge bracket 6 is fixed to the groove portion 27 of the rocker panel 8, and the wire harness 14 extends outwardly from the slide protector 11, and passes through the groove portion 27, and passes through a hole 32 in the rocker panel 8, and is installed in the vehicle body. The relevant portion of the wire harness is waterproofed by a waterproof grommet 33 of an elastic nature fitted in the hole 32.

The link arm 2 is formed, for example, into a rectangular tubular shape, using a metallic material of a high rigidity. The link arm 2 serves to support the door 1 on the vehicle body 4, and also serves to install the wire harness 14 from the vehicle body 4 to the door 1. The link arm 2 is pivotally supported on left and right link brackets 5 and 6 by respective shaft portions 7. The angle of pivotal movement of the link arm 2 is, for example, about 120 degrees.

The slide protector 11 is mounted on a front side surface of the link arm 2. Incidentally, the slide protector 11 can be mounted on a rear surface, an upper surface or a lower surface of the link arm 2. In the case where the link arm 2 is mounted on the rear surface of the link arm 2, it is preferred that the wire harness 14 be led out through a gap between the link bracket 6 and the link arm 2. Here, the slide protector 11 is mounted on the front surface of the link arm 2 so that the wire harness 14 is led out forwardly along the rocker panel 8.

Figure 5:
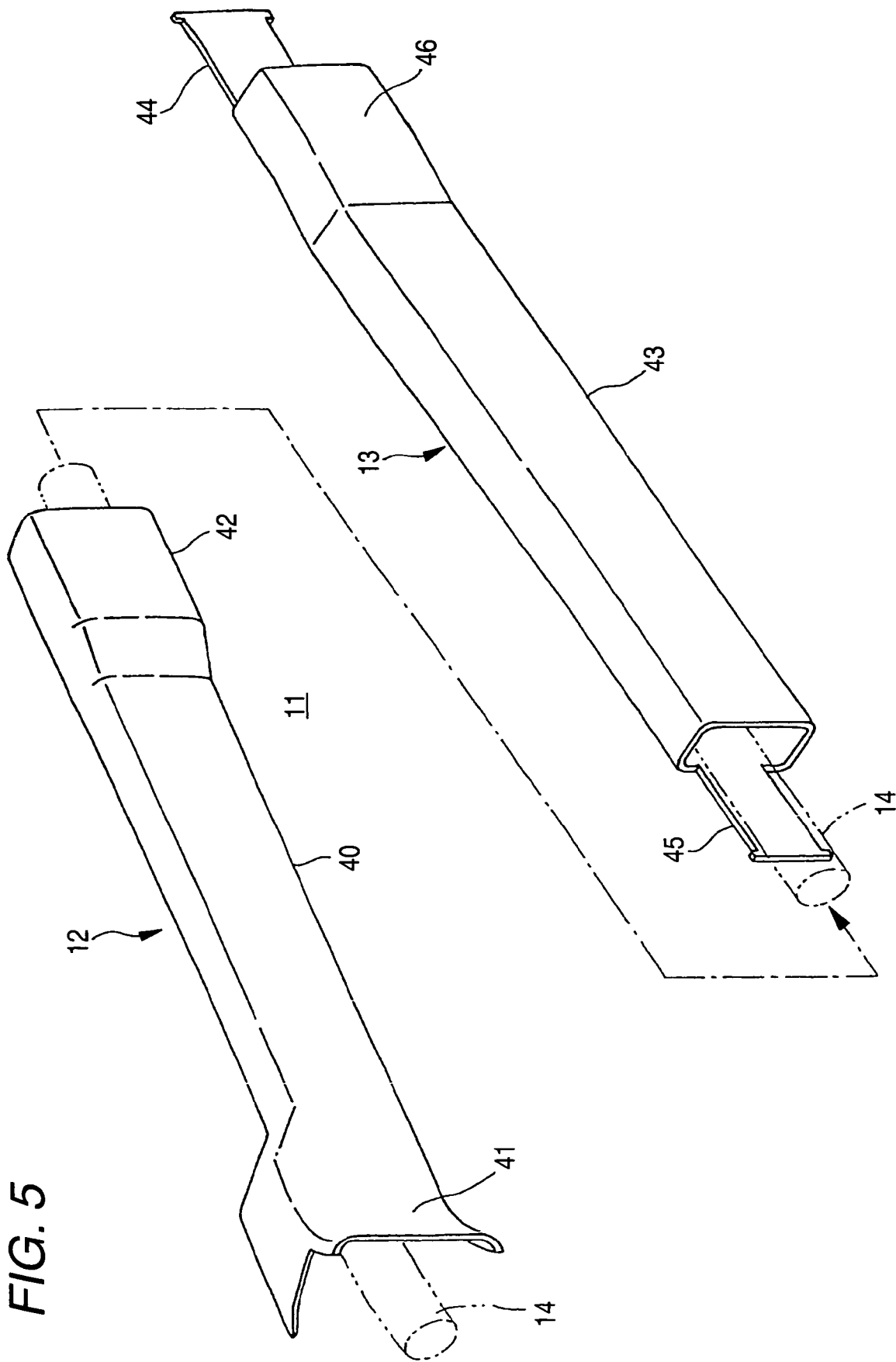
FIG. 5 is an exploded, perspective view showing one example of a slide protector used in the harness installation structure.
Figure 6:
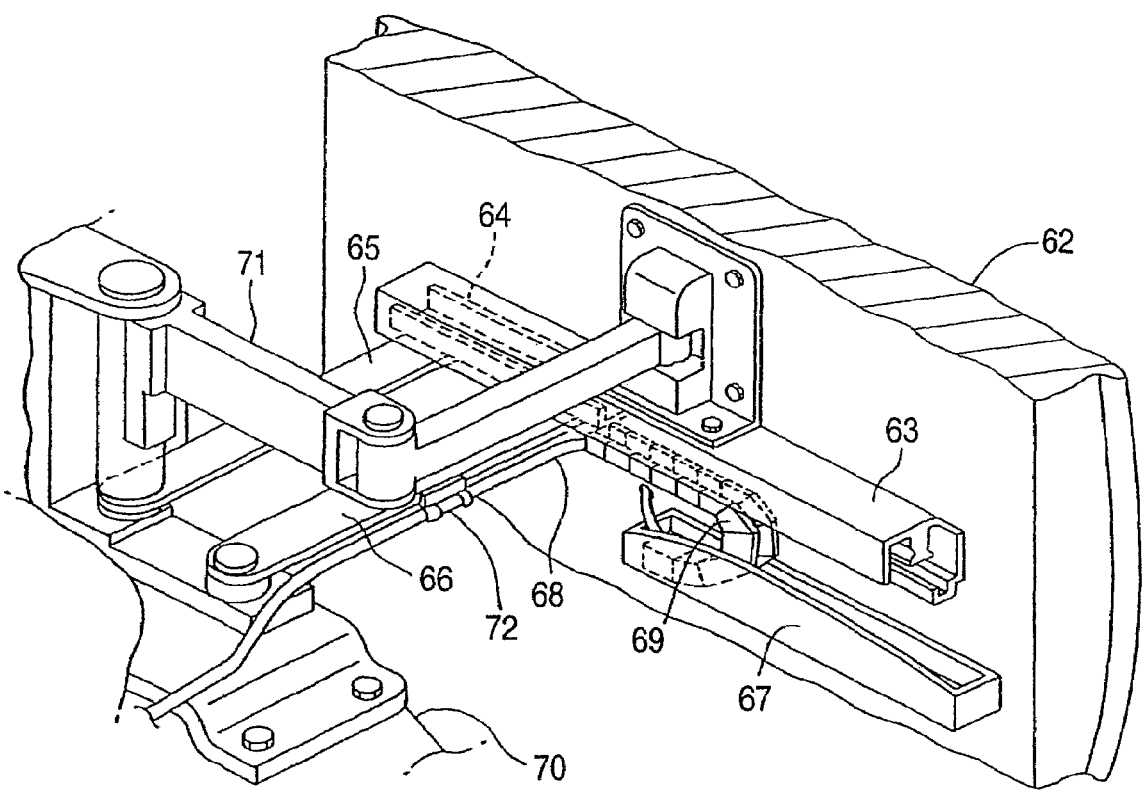
FIG. 6 is a perspective view showing one example of a related harness installation structure of a link-type movable body.

FIG. 5 shows one form of slide protector 11. As shown in this Figure, an outer protector 12 includes a rectangular tubular portion 40, a curved guide portion 41 formed at a (door-side) distal end thereof, and a larger-width portion 42 formed at a proximal end thereof for the purpose of introducing an inner protector. The inner protector 13 includes a rectangular tubular portion 43, a harness fixing plate 44 formed at a (vehicle body-side) distal end thereof, and a harness fixing plate 45 formed at a proximal end thereof. The wire harness 14 is fixed to the two fixing plates 44 and 45, for example, by winding a tape. The wire harness 14 is not fixed to the outer protector 12. One of the fixing plates 44 and 45 can be omitted.

The outer protector 12 is fixed to the link arm 2 (in FIG. 3), for example, by retaining clips formed integrally with the outer protector 12, and the inner protector 13 can move back and forth within the outer protector in the longitudinal direction of the link arm 2. The retaining clip (not shown) is of the known type, and has a pair of inclined claws formed at a distal end of a support post thereof, and the claws are engaged in a hole in the link arm. Although the length of the inner protector 13 relative to the length of the outer protector 12 can be suitably determined, it is preferred that the two protectors 12 and 13 have generally the same length so that the sliding movement can be effected smoothly.

In FIG. 3, a wire harness portion 14a, led out of the slide protector 11 toward the door, is horizontally fixed to a fixing plate 21 (FIG. 2) formed at a distal end of a swinging portion 18 (FIG. 2) of a harness protector 47, for example, by winding a tape, and extends generally vertically upwardly within the protector 47 (The upwardly-extending portion is designated by reference numeral $14a_1$.), and further extends rearward horizontally along the protector 47, and then extends vertically upwardly, and is installed on the door inner panel 1a.

The protector 47 includes a protector body formed by the thin plate-like swinging portion 18 (projecting toward the vehicle body 4) and a trough-like portion of a generally crank-shape continuous with the swinging portion 18, and a plate-like cover which covers a harness passage opening of the trough-like portion and is retained on the trough-like portion by retaining means. The trough-like portion includes upper and lower vertical portions (vertical protector portions) 54 and 15, and an intermediate horizontal portion (horizontal protector portion) 16. The upper vertical portion 54 (FIG. 1) is continuous with the horizontal portion 16 through an inclined portion, and the swinging portion 18 is continuous with an inner side wall of the lower vertical portion 15 to be disposed generally flush therewith.

The wire harness 14 (FIG. 3) is fixed to a fixing plate continuous with the upper vertical portion 54, for example, by winding a tape, and the relevant portion of the wire harness is waterproofed by an elastic through-less grommet 17 (FIG. 1) fitted in a groove portion in the door inner panel 1a. The cover covers an opening of the intermediate horizontal portion 16 and an opening of the upper vertical portion 54, and retains the wire harness 14 within the trough-like portion. The protector 47 is a through-less protector which is surface-mounted on the door inner panel 1a.

As shown in FIG. 3, the link bracket 6 of a generally U-shaped cross-section is fixed to the door 1, and the intermediate horizontal portion 16 of the door-side harness protector 47 is disposed on the upper surface of the link bracket 5, and is fixed to the door inner panel 1a by a retaining clip 58. The lower vertical portion 15 (FIG. 1) is disposed at the inner side of the link bracket 5, and extends along the link arm 2 at a position forwardly of the shaft portion 7 (FIG. 4) of the link arm 2. The upper vertical portion 54 extends vertically upwardly above the link bracket 5.

When the door is fully opened as shown in FIG. 3, the wire harness 14, while fixed by the door-side protector 47, is supported in a forwardly-swung condition by the swinging portion 18 of the protector 47, and is installed obliquely forwardly straight along the link arm 2 by the slide protector 11, and that portion of the wire harness 14 extending from the slide protector 11 to the rocker panel 8 is smoothly curved with a large radius of curvature (bending). The wire harness 14 is pulled toward the rocker panel 8, so that the slide protector 11 is longitudinally expanded long.

When the door 1 is closed forwardly from its fully-open condition of FIG. 3 as shown in FIG. 4, the wire harness 14, while fixed by the door-side protector 47, is supported in a rearwardly-swung condition by the swinging portion 18 of the protector 47 at a position disposed forwardly of the shaft portion 7, and a horizontal harness portion $14a_2$ is bent in an outwardly-detouring condition (This detour portion is designated by reference numeral $14a_3$.), and the wire harness 14 within the slide protector 11 extends obliquely rearwardly along the link arm 2.

The horizontal harness portion $14a_2$ detours outwardly, and a distal end 41a of the outer protector 12 moves away from the upwardly-extending harness portion $14a_1$, and also the inner protector 13 moves nearer to the rocker panel than in the door fully-opened condition of FIG. 5, so that the wire harness 14 is compressed between the rocker panel and the inner protector 13 in the longitudinal direction, and the inner protector 13 is inserted deeper into the outer protector 12, so that the slide protector 11 is shortened, and the wire harness 14 is folded back to be bent into a generally U- or J-shape (The bent portion is designated by reference numeral 26.). A surplus length of the wire harness 14 is absorbed by this bending movement of the wire harness 14.

During the time when the door is moved from its fully-closed condition of FIG. 4 to its fully-open condition of FIG. 3, the detour portion $14a_3$ of the wire harness 14 is extended or expanded, and the distal end 41a of the outer protector 12 approaches the upwardly-extending harness portion $14a_1$, and also the slide protector 11 moves away from the vehicle body. As a result, the wire harness 14 is sent out and drawn out of the slide protector 11 toward the vehicle body, so that a harness portion 14c is easily smoothly curved with a large radius of bending, thereby absorbing a surplus length of the wire harness.

Thus, the wire harness 14 is fixed at the door, and is swingably supported by the swinging portion 18 of the protector 47, and a surplus length of the wire harness 14 is produced and absorbed only at the vehicle body. Therefore, a management point for a surplus length is reduced to one, and the design and management for positively effecting the continuous power supply can be facilitated, and the reliability of the continuous power supply is enhanced.

In the above embodiment, although the slide protector 11 is used, the provision of the slide protector 11 can be omitted, and instead there can be used one harness protector (not shown) of a rectangular tubular shape as a second embodiment, in which case the wire harness 14 is received in a bent condition (e.g. in a corrugated condition) within the harness protector so that the thus bent wire harness can replace the slide protector 11 which can be expanded and contracted. In this case, when the door (movable body) 1 is fully opened, the wire harness 14 is extended straight within the protector, and when the door 1 is fully closed, the wire harness 14 is bent in a corrugated, spiral or any other suitable form within the protector.

In the above embodiment, the slide protector 11 comprises the outer protector 12, and the inner protector 13 which is engaged in the outer protector so that the slide protector can be longitudinally expanded and contracted. However, for example, there can be used a construction in which a rail (not shown) is provided along the link arm 2, and one tubular slide protector is slidably engaged with the rail, and the wire harness 14 is passed through this slide protector, and is fixed thereto.

Furthermore, in the above embodiment, although the wire harness is installed such that it is exposed at the rocker panel of the vehicle body (fixed body), a corrugated tube can be mounted on this exposed portion (designated by reference numeral 14c for convenience) of the wire harness, or an elastic waterproof grommet or a swinging protector (not shown) can be mounted on the exposed harness portion.

Furthermore, the door (movable body)-side protector 47 can have any suitable shape in so far as it can firmly fix the wire harness without producing any surplus length portion. The swinging portion 18 of the protector 47 is not limited to the plate-shape, but can have a rod-shape or any other suitable shape, and does not always need to be flexible in so far as it supports the wire harness portion 14a (led out of the slide protector 11) horizontally or generally horizontally, and fixes the wire harness 14, and allows the harness portion 14a to be swung forward and rearward generally about the axis of the upwardly-extending portion $14a_1$ of the wire harness 14 without changing the length of the harness portion 14a (Since the wire harness 14 is fixed to the swinging portion 18, the length of the harness portion 14a at the swinging portion 18 is always constant.) when the door is opened and closed, and also allows the smooth twisting movement of the upwardly-extending portion $14a_1$ when the door is opened and closed. The swinging portion 18 can be formed separately from the protectors 15 and 47, and can be mounted on the inner panel 1a or other portion of the door 1.

Furthermore, the provision of the swinging portion 18 of the protector 47 can be omitted, and the upwardly-extending portion $14a_1$ of the wire harness 14 can be supported within the protector 47 so as to be twisted. In this case, preferably, for example, the upwardly-extending portion $14a_1$ is received within a tubular vertical portion narrower than the vertical portion 15 of the protector 47, and the horizontal portion $14a_2$ (FIG. 4) of the wire harness 14 continuous with the lower end of the upwardly-extending portion $14a_1$ is led out toward the slide protector 11 through a narrow opening formed in the lower portion of the vertical portion 15 of the protector 47.

The above harness installation structure of the link-type movable body can be applied to other doors than the automotive link-type door such as a link-type door of an electric train, a locomotive or the like and a link-type door, a link-type cover, etc., of a processing machine, an inspection apparatus, etc. In this case, a vehicle body of the electric train, the locomotive or the like, a machine body of the processing machine and an apparatus body of the inspection apparatus or the like are called the fixed body.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

The present application is based on Japan Patent Application No. 2005-374691 filed on Dec. 27, 2005, the contents of which are incorporated herein for reference.

What is claimed is:

1. A harness installation structure, comprising:
a link arm that pivotally supports a movable body to a fixed body;
a wire harness that is installed to extend from the fixed body to the movable body along the link arm; and
a slide protector that is provided on the link arm,
wherein the wire harness is fixed without looseness at a region between one end of the link arm and the movable body;
wherein the wire harness is installed to extend in a bendable manner from the other end of the link arm to the fixed body;
wherein while the movable body is moved between an opened position and a closed position, a surplus length of the wire harness is produced at the fixed body portion of the wire harness, and the surplus length is absorbed by bending the wire harness
wherein the wire harness is installed at the slide protector, and is fixed to the slide protector; and
wherein a harness surplus length, produced between the movable body and the fixed body while the movable body is moved between the opened position and the closed position, is sent toward the fixed body by the slide protector, and the wire harness is bent at a fixed body-side region so that the harness surplus length is absorbed.

2. The harness installation structure according to claim 1, wherein the movable body is a door, and the fixed body is a vehicle body.

3. A harness installation structure, comprising:
a link arm that pivotally supports a movable body to a fixed body;
a wire harness that is installed to extend from the fixed body to the movable body along the link arm; and
an upwardly-extending portion of the harness that is formed at a movable body-side,
wherein the wire harness is fixed without looseness at a region between one end of the link arm and the movable body;
wherein the wire harness is installed to extend in a bendable manner from the other end of the link arm to the fixed body; and
wherein while the movable body is moved between an opened position and a closed position, a surplus length of the wire harness is produced at the fixed body portion of the wire harness, and the surplus length is absorbed by bending the wire harness
wherein the upwardly-extending portion of the harness is twisted in its peripheral direction while the movable body is moved between the opened position and the closed position.

4. The harness installation structure according to claim 3, further comprising a harness protector that is provided on the link arm,
wherein the surplus length of the wire harness is absorbed by bending the wire harness within the harness protector.

5. The harness installation structure according to claim 3, wherein the movable body is a door, and the fixed body is a vehicle body.

6. A harness installation structure, comprising:
a link arm that pivotally supports a movable body to a fixed body;
a wire harness that is installed to extend from the fixed body to the movable body alone the link arm; and
a swinging portion that horizontally fixes the wire harness at the region between the one end of link arm and the movable body,
wherein the wire harness is fixed without looseness at a region between one end of the link arm and the movable body;
wherein the wire harness is installed to extend in a bendable manner from the other end of the link arm to the fixed body; and
wherein while the movable body is moved between an opened position and a closed position, a surplus length of the wire harness is produced at the fixed body portion of the wire harness, and the surplus length is absorbed by bending the wire harness.

7. The harness installation structure according to claim 6, wherein the swinging portion has flexibility.

8. The harness installation structure according to claim 6, further comprising a harness protector that is provided on the link arm, wherein the surplus length of the wire harness is absorbed by bending the wire harness within the harness protector.

9. The harness installation structure according to claim 6, wherein the movable body is a door, and the fixed body is a vehicle body.

* * * * *